United States Patent Office 2,696,246
Patented Dec. 7, 1954

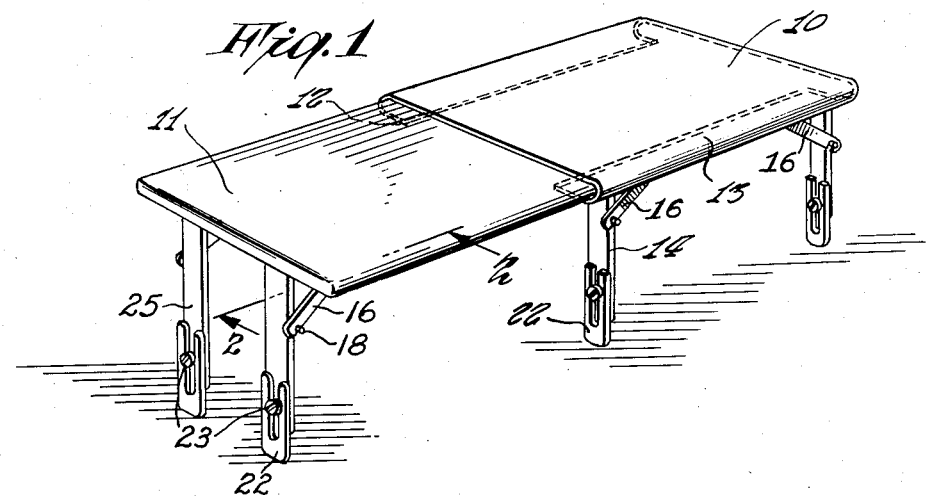
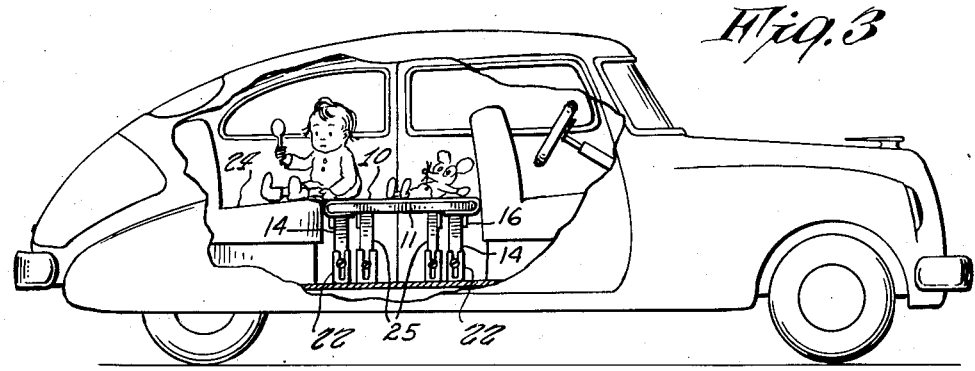
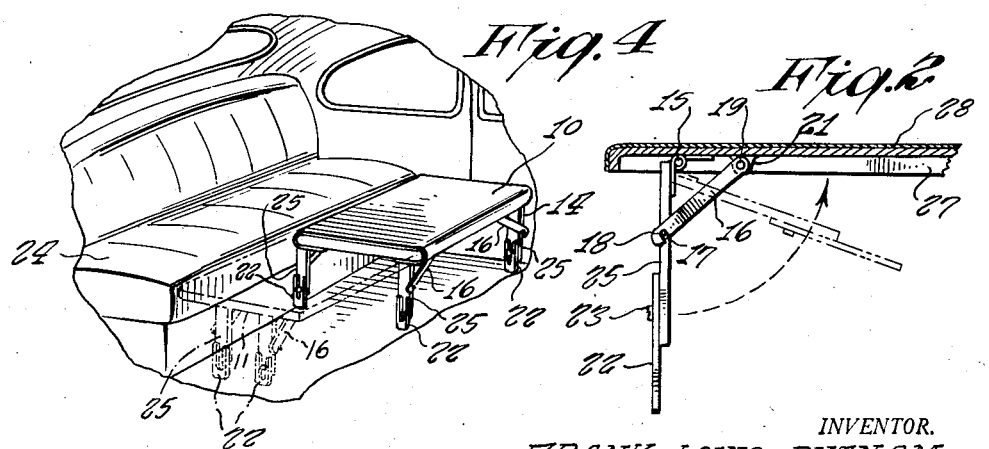

2,696,246

AUTOMOBILE SEAT EXTENSION

Frank Louis Putnam, Long Island City, N. Y.

Application September 21, 1950, Serial No. 186,031

2 Claims. (Cl. 155—12)

This invention relates to an automobile seat extension. It is an object of the present invention to provide an adjustable seat extension adapted to rest on the rear floor of the automobile in front of the rear seat so as to provide an extension on which a child can sit and which serves as a guard to prevent the child from falling off the rear seat when asleep and also to provide a safe wide seat on which the children can play while traveling in the car.

It is another object of the present invention to provide a car seat extension which is adjustable and can be folded into a compact package when not in use and stored in the rear trunk.

Other objects of the present invention are to provide a car seat extension which is of simple construction, inexpensive to manufacture, has a minimum number of parts, easy to adjust, easy to collapse, compact, formed of light weight metal, has adjustable legs and efficient in operation.

For other objects and for a better understanding of the invention, reference may be had to the following detailed description taken in connection with the accompanying drawing, in which Fig. 1 is a perspective view of the automobile seat extension embodying the features of the present invention.

Fig. 2 is a fragmentary sectional view taken on line 2—2 of Fig. 1.

Fig. 3 is a side elevational view of an automobile with a portion of the automobile broken away and looking upon the end of the automobile seat extension.

Fig. 4 is a fragmentary perspective view of the automobile looking into the rear seat compartment with the seat extension retracted and lying in front of the rear seat.

Referring now to the figures, 10 and 11 represent respectively top parts. The part 10 has folded under sides or guide portions 12 and 13 and the part 11 is slidable into the part 10 along the guide portions 12 and 13.

The part 10 has legs 14 depending from each corner of the same. Each leg is hingedly connected by a hinge, as shown in Fig. 2 at 15, and is held in its extended position by a hook bracket or brace 16 that has a slot 17 which extends over a pin 18 on the leg. Legs 14 are hinged to part 10, while the upper end of the brace 16 is hingedly connected at 19 to a depending bracket 21 beneath top part 10 as in the case of brace 16 beneath top part 11. On each leg is an extension 2 which is made secure to the leg by a screw 23 in its adjusted position. By adjusting the extensions the table top 10 can be located at the proper height with respect to seat 24.

The part 11 has similar legs 25 which are hinged, as shown in Fig. 2, in each case by a hinge 15 to the underside of top part 11, which is connected to legs 25 additionally by similar braces 16 against collapse.

Obviously, the brackets 21, braces 16 and legs 25 beneath top part 11 are spaced a sufficiently short transverse distance apart to clear lower inner edges 12 of top part 10 when the table is collapsed or telescoped together.

To fill up the entire floor space of the automobile, the top part 11 is pulled out of the part 10 to the extended position, as indicated by dotted lines in Fig. 4.

To collapse the table top parts, the part 11 is merely slid or telescoped into the part 10. The legs 14 and 25 of the respective parts are folded in to the respective undersides of top parts 10 and 11, so as to provide a small package which can be easily stored in the trunk of the automobile.

Each top part is formed of relatively thick material, as shown at 27, and covered with a thin sheet 28.

It will be apparent that the extension can be adjusted to different lengths and also to different heights in order to properly fit the floor space in the rear compartment of the automobile. A child can play upon the top parts and move freely from the top parts to the seat and when sleeping on the seat will be prevented from falling onto the floor.

While various changes may be made in the detail construction, it shall be understood that such changes shall be within the spirit and scope of the present invention as defined by the appended claims.

Having thus set forth and disclosed the nature of my invention, what is claimed is:

1. An automobile seat extension including a pair of telescoping top parts, one top part being an outer part which is relatively thin and having two opposite folded over side edges forming guide portions enveloping the corresponding side edges of the other top part and allowing the latter to slide beneath the outer top part and out therefrom to extend from said top part, hinges secured in each of the four corners beneath said outer top part and legs individually connected to the hinges for folding under the legs transversely with respect to the ends of the top parts, a pair of hinges secured beneath two corners of the other top part at one end only thereof with two legs individually connected to the latter two hinges for folding the two legs transversely inward beneath said other top part with respect to the folded over side edges of said outer top part, a plurality of braces pivotally connected to the undersides of the two top parts and individually connectible to the hinged legs thereof, the braces and legs beneath said other top part being spaced a sufficiently short distance apart to clear the enveloping edges of the first mentioned top part in telescoped condition of said top parts, and extension members individually and adjustably secured exteriorly upon the legs of said top parts.

2. An automobile seat extension according to claim 1, wherein the extension member upon each leg is an upwardly open U-shaped part.

References Cited in the file of this patent

UNITED STATES PATENTS

| Number | Name | Date |
|---|---|---|
| 7,789 | Shoenberger | Nov. 19, 1850 |
| 1,063,642 | Birdsall | June 3, 1913 |
| 1,982,859 | Derbyshire | Dec. 4, 1934 |
| 2,493,170 | Stiff et al. | Jan. 3, 1950 |
| 2,503,602 | Titley | Apr. 11, 1950 |